US008170586B2

(12) United States Patent
Yasuhara et al.

(10) Patent No.: US 8,170,586 B2
(45) Date of Patent: May 1, 2012

(54) MOVING BODY COMMUNICATION SYSTEM, MOVING BODY TERMINAL, INFORMATION PROVIDING APPARATUS, AND INFORMATION TRANSMISSION METHOD

(75) Inventors: Shinji Yasuhara, Atsugi (JP); Masayuki Ohsugi, Sagamihara (JP); Tsuneyuki Watanabe, Isehara (JP); Maki Ueda, Yamato (JP); Yasuhisa Nakamura, Machida (JP); Daisuke Nakata, Katsushika (JP); Yasunori Kondo, Toride (JP); Takuya Hashimoto, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 820 days.

(21) Appl. No.: 12/237,724

(22) Filed: Sep. 25, 2008

(65) Prior Publication Data

US 2009/0088184 A1    Apr. 2, 2009

(30) Foreign Application Priority Data

Sep. 28, 2007  (JP) ................................ 2007-253452

(51) Int. Cl.
*H04W 24/00*  (2009.01)
(52) U.S. Cl. .................. 455/457; 455/456.1; 455/456.5; 455/456.6; 340/988; 340/990; 340/995.1; 340/995.12; 701/200; 701/208; 701/209
(58) Field of Classification Search .................. 455/466, 455/95, 99, 345, 404.1, 404.2, 418–420, 455/440, 441, 456.1–457, 550.1, 556.2, 566, 455/569.2; 340/539.13, 988–994, 995.1, 340/995.11, 995.12–995.15, 995.19, 995.2; 701/200, 201, 207, 208, 209, 212, 213
See application file for complete search history.

(56) References Cited

U.S. PATENT DOCUMENTS

| 5,778,304 A * | 7/1998 | Grube et al. ............... 455/456.4 |
| 6,414,630 B1 * | 7/2002 | Usui ........................ 342/357.31 |
| 7,257,485 B2 * | 8/2007 | Sumizawa et al. ............ 701/454 |

(Continued)

FOREIGN PATENT DOCUMENTS

CN          1415977 A        5/2003
(Continued)

OTHER PUBLICATIONS

The Chinese Office Action of corresponding Chinese Application No. 200810161913.6, dated Oct. 13, 2010.

*Primary Examiner* — Anthony Addy
(74) *Attorney, Agent, or Firm* — Global IP Counselors, LLP

(57) ABSTRACT

A moving body terminal is basically provided with a position information acquiring section, a receiving section and a control section. The position information acquiring section is configured to acquire position information indicating a current position of the moving body terminal. The receiving section is configured to receive from an information providing apparatus simple map information which includes information transmission determining information indicating an information transmission unnecessary region of the simple map information where the position information of the moving body terminal is not required to be transmitted from the moving body terminal to the information providing apparatus. The control section is configured to prohibit a transmission of the position information to the information providing apparatus when the position information acquired by the position information acquiring section is inside the information transmission unnecessary region contained in the simple map information that was received.

22 Claims, 7 Drawing Sheets

U.S. PATENT DOCUMENTS

| | | | |
|---|---|---|---|
| 7,894,829 B2 * | 2/2011 | Kim | 455/456.3 |
| 8,054,167 B2 * | 11/2011 | Yasuhara et al. | 340/435 |
| 2002/0061754 A1 * | 5/2002 | Takano | 455/456 |
| 2002/0090953 A1 * | 7/2002 | Aburai et al. | 455/456 |
| 2003/0084119 A1 | 5/2003 | Ichimura | |
| 2004/0053625 A1 * | 3/2004 | Bye | 455/456.1 |
| 2005/0134453 A1 * | 6/2005 | Yamada | 340/539.13 |
| 2006/0128398 A1 * | 6/2006 | Chin et al. | 455/456.3 |
| 2006/0258371 A1 * | 11/2006 | Krishnamurthi et al. | 455/456.1 |

FOREIGN PATENT DOCUMENTS

JP 2002-288785 10/2002

* cited by examiner

SHORTEST DISTANCE

MOVING BODY COMMUNICATION SYSTEM, MOVING BODY TERMINAL, INFORMATION PROVIDING APPARATUS, AND INFORMATION TRANSMISSION METHOD

CROSS-REFERENCE TO RELATED APPLICATIONS

This application claims priority to Japanese Patent Application No. 2007-253452, filed on Sep. 28, 2007. The entire disclosure of Japanese Patent Application No. 2007-253452 is hereby incorporated herein by reference.

BACKGROUND OF THE INVENTION

1. Field of the Invention

The present invention generally relates to a moving body communication system and an information transmission method that controls an operation of a moving body by providing information to the moving body in accordance with position information indicating a position of a moving body terminal. The present invention further relates to a moving body terminal and an information providing apparatus that make up such a moving body communication system.

2. Background Information

Japanese Patent No. 3,549,850 (Japanese Laid-Open Patent Publication No. 2002-288785) discloses technology for notifying a driver of a vehicle of the existence of the pedestrian, in which position information is transmitted from a portable terminal held by a pedestrian to an information providing server such that a position of the pedestrian is recognized on a map by the information providing server (see, paragraph 0043 of this Japanese Patent). In such technology, the portable terminal held by a pedestrian creates position information indicating a position of the pedestrian's portable terminal using GPS and then transmits the position information to the information providing server periodically (i.e. regularly according to a prescribed cycle period).

SUMMARY OF THE INVENTION

It has been discovered that with the technology described above, it is necessary to send position information indicating the position of a pedestrian to the information providing server periodically in order for the information providing server to notify a driver of vehicle regarding the existence of the pedestrian in a vicinity of the vehicle. Thus, with this technology, the electric power consumption of the moving body terminal is large because it transmits position information on a periodic basis.

In view of the state of the known technology, one object is to provide a moving body communication system and an information transmission method that can reduce the number of times position information indicating a position of a moving body (e.g., a pedestrian) is transmitted and thereby reduce the electric power consumption of a moving body terminal of the moving body (e.g., a pedestrian). Another object is to provide a moving body terminal and an information providing apparatus that make up such a moving body communication system.

In accordance with one aspect, a moving body terminal is basically provided that comprises a position information acquiring section, a receiving section and a control section. The position information acquiring section is configured to acquire position information indicating a current position of the moving body terminal. The receiving section is configured to receive from an information providing apparatus simple map information which includes information transmission determining information indicating an information transmission unnecessary region of the simple map information where the position information of the moving body terminal is not required to be transmitted from the moving body terminal to the information providing apparatus. The control section is configured to prohibit a transmission of the position information to the information providing apparatus when the position information acquired by the position information acquiring section is inside the information transmission unnecessary region contained in the simple map information that was received.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
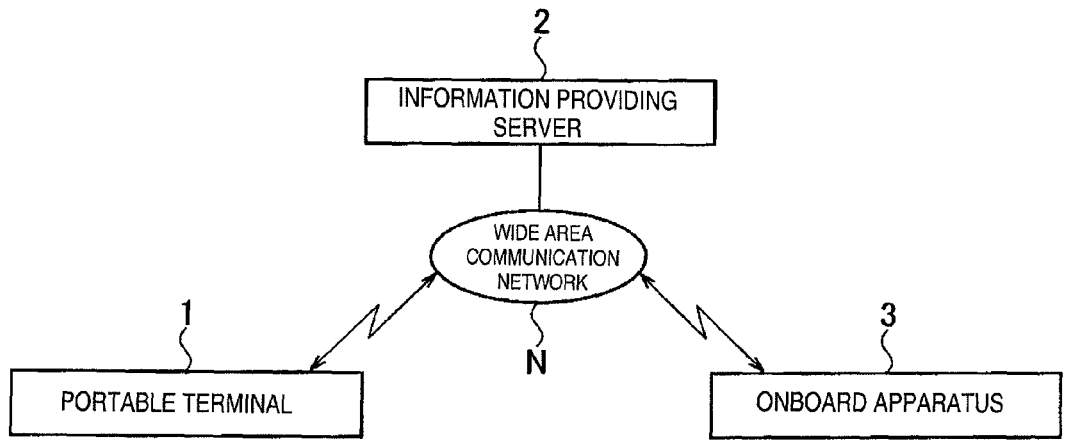
FIG. 1 is a block diagram showing basic components of an information providing system (e.g., a moving body communication system) in accordance with one embodiment.

Referring initially to FIG. 1, an information providing system (e.g., a moving body communication system) is illustrated in accordance with a first embodiment. The information providing system (e.g., a moving body communication system) is intended to alert a driver of a host vehicle of the existence moving bodies (e.g., pedestrians, people riding bicycles, other vehicles) on a road in order to urge the driver to pay attention to the moving bodies. Thus, the term "moving body" is not limited to a pedestrian. More specifically, the term "moving body" any moving object that includes an ability to communicate with the host vehicle directly, or indirectly. For example, it is acceptable for one or two moving bodies to be a portable terminal held by a user riding a bicycle or portable terminal held by a user riding a motorcycle, or for a first moving body to be a bicycle and a second moving body to be a vehicle, or for two moving bodies to be both portable terminals or both vehicles.

Thus, basically in this information providing system (e.g., a moving body communication system), a portable terminal (e.g., moving body terminal) 1 possessed by a moving body (e.g., pedestrians, people riding bicycles, other vehicles) sends information indicating a position of the portable terminal(s) 1 to a remote (off-board) information providing server 2. Then, the information providing server 2 sends information necessary for reporting the existence of the moving body (e.g., pedestrians, people riding bicycles, other vehicles) to an onboard apparatus 3 of the host vehicle. The onboard apparatus 3 constitutes a vehicle information notifying apparatus, and serves to report the existence of the moving body (e.g., pedestrians, people riding bicycles, other vehicles) to the driver of the host vehicle. The exchange of information between the portable terminal(s) 1 and the information providing server 2 and the exchange of information between the information providing server 2 and the onboard apparatus 3 is conducted through a wide area communication network N, e.g., a mobile communication network or a wired public communication network, that includes general purpose communication circuits. Although FIG. 1 shows only one portable terminal(s) 1 and one onboard apparatus 3, the information providing server 2 can conduct communication among pluralities of portable terminals 1 and onboard apparatuses 3.

Figure 2:
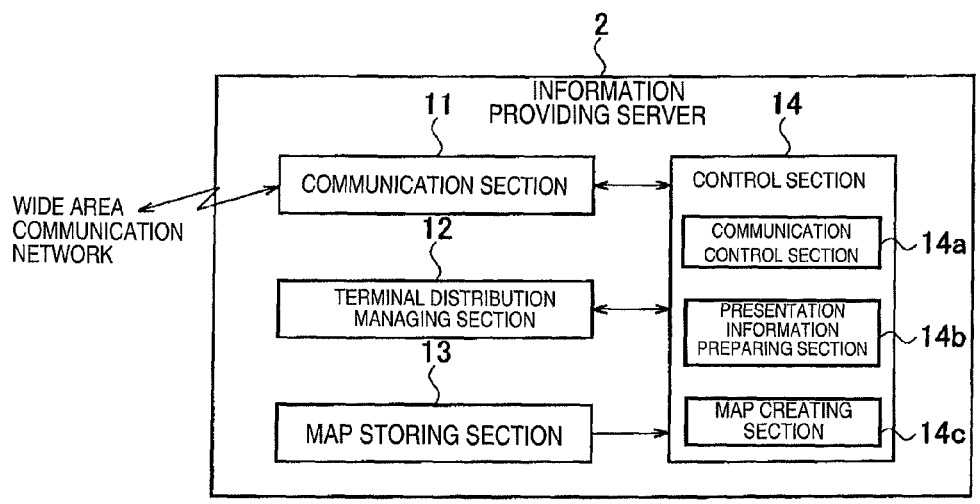
FIG. 2 is a block diagram showing basic components of an information providing server of the information providing system (e.g., a moving body communication system) illustrated in FIG. 1.

As seen in FIG. 2, the information providing server 2 basically includes a communication section 11, a terminal distribution management section 12, a map storing section 13, and a control section 14. The communication section 11 is configured to exchange information between the portable terminal(s) 1 and the onboard apparatus 3 through the wide area communication network N. The terminal distribution management section 12 is configured to manage a distribution of portable terminals 1. The map storing section 13 is configured to map data. The control section 14 is configured to control the operation of the information providing server 2 as a whole. The information providing server 2 is a microcomputer that includes a central processing unit, an input interface circuit, an output interface circuit, and storage devices such as a ROM (Read Only Memory) device and a RAM (Random Access Memory) device. FIG. 2 is a block diagram illustrating the functions of the information providing server 2 as separate blocks or sections. These blocks or sections 11, 12, 13 and 14 are formed of conventional hardware and/or software.

The communication section 11 also has an antenna circuit configured to send and receive wireless signals to and from the wide area communication network N, a transmission circuit configured to transmit wireless signals to the wide area communication network N, and a receiving circuit configured to process wireless signals received from the wide area communication network N. The communication section 11 serves to convert received wireless signals into digital information and supply the digital information to the control section 14. The communication section 11 also serves to generate a wireless signal when it receives digital information to be transmitted to the wide area communication network N from the control section 14. More specifically, the communication section 11 receives position information transmitted from the portable terminal(s) 1 through the wide area communication network N. Also the communication section 11 receives map information transmission requests sent through the wide area communication network N from the portable terminal(s) 1. Moreover, the communication section 11 transmits simple map data supplied from the control section 14 to the portable terminal(s) 1.

The communication section 11 is configured to receive information transmission requests sent from the onboard apparatus 3 through the wide area communication network N. These requests include a request for transmission of position information and map information and a request for presentation transmission (e.g., simple map data) that is used in order report the existence of the portable terminal(s) 1, i.e., the existence of a moving body, to a driver of the vehicle in which the onboard apparatus 3 is installed. The operation of the communication section 11 is controlled by a communication control section 14a of the control section 14.

The communication control is accomplished by the communication control section 13a controlling the communication section 11 to establish and break a communication connection between the information providing server 2 and the portable terminal(s) 1. When the onboard apparatus 3 starts up, the control processing necessary for establishing a communication connection between the onboard apparatus 3 and the information providing server 2 is also accomplished by the communication control section 14a controlling the communication section 11.

The terminal distribution management section 12 is configured to store position information sent from a plurality of the portable terminals 1 (terminal position information) and position information sent from a plurality of the onboard apparatuses 3 (host vehicle position information). The terminal position information and the host vehicle position information are both expressed in terms of longitude and latitude. The terminal distribution management section 12 stores terminal position information expressing the positions of the portable terminals 1 for which a communication connection has been established with respect to the communication section 11, and the host vehicle position information expressing the positions of the onboard apparatuses 3 for which a communication connection has been established with respect to the communication section 11. The terminal distribution management section 12 creates distribution data that includes the terminal position information and the host vehicle position information distributed on map information (simple map data) stored in the map storing section 13 (described later)

The terminal distribution management section 12 executes processing to update the simple map data at each prescribed cycle period when terminal position information is sent from the portable terminals 1 and processing to update the simple map data at each prescribed cycle period when the host vehicle position information is sent from the onboard apparatuses 3. The simple map data updated by the terminal distribution management section 12 is processed by a presentation information preparing section 14*b* into information tailored to be provided to the onboard apparatus 3 when the simple map data is sent to the onboard apparatus 3. In other words, the presentation information preparing section 14*b* executes processing to extract a portion of the distribution data created by the terminal distribution management section 12 and creates the presentation data (e.g., simple map data) to be sent to the onboard apparatuses 3. The communication control section 14*a* controls the communication section 11 to accomplish transmitting the information to the onboard apparatus 3 through the wide area communication network N.

For example, when the onboard apparatus 3 is started, and/or on a periodic basis, a presentation information transmission request is sent to the information providing server 2 requesting information for ascertaining the existence of the portable terminal(s) 1 in the vicinity of the onboard apparatus 3. The presentation information transmission request includes the host vehicle position information from the onboard apparatus 3. When the information transmission request is received, the presentation information preparing section 14*b* creates presentation information (e.g. simple map data) expressing a distribution of portable terminals 1 centered on the host vehicle position information. The communication control section 14*a* then controls the communication section 11 so as to transmit the presentation information (e.g. simple map data) to the onboard apparatus 3 that sent the information transmission request. In this way, the information providing server 2 can present the existence of a moving body in the vicinity of the host vehicle in which the onboard apparatus 3 is installed to a driver of the host vehicle based on the host vehicle position information obtained from the onboard apparatus 3.

Figure 3:
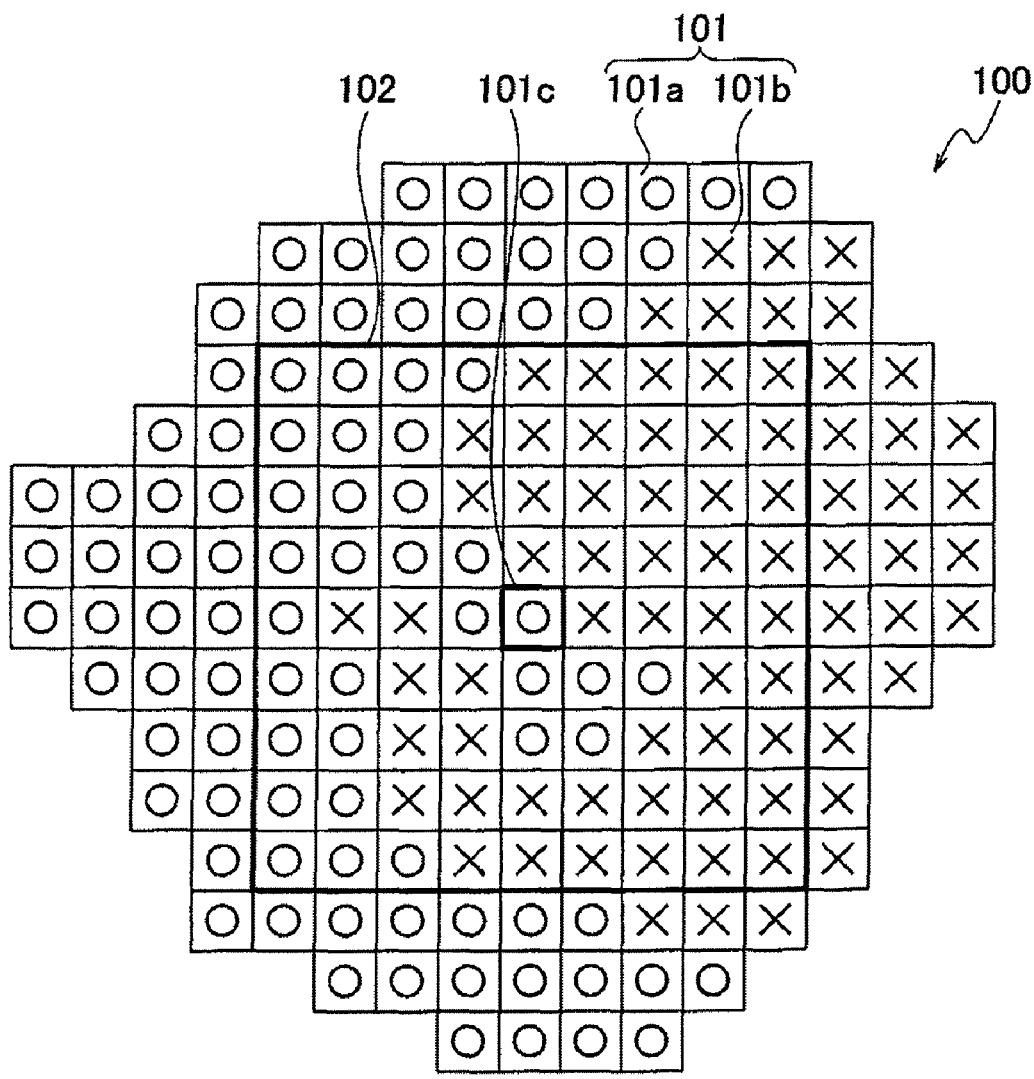
FIG. 3 is a diagram illustrating simple map data used in the information providing system (e.g., a moving body communication system) illustrated in FIG. 1.

The map storing section 13 stores detailed map data that includes link data and node data expressing roads and intersections and records points on a map as longitude and latitude information. The map storing section 13 also stores simple map data in which the detailed map data has been divided into a grid of unit regions each having a prescribed area as seen in FIG. 3. Added to the simple map data is information transmission determining information that indicates if each unit region is an information transmission necessary region where it is necessary for a portable terminal(s) 1 to transmit terminal position information or an information transmission unnecessary region where it is not necessary for a portable terminal (s) 1 to transmit terminal position information.

More specifically, as shown in FIG. 3, the simple map data 100 is divided into a grid made up of unit regions having a prescribed area. Each unit region 101 is assumed to have the shape of a square whose sides are each several meters to several tens of meters long. It is also acceptable for the shape of the unit region 101 to be hexagonal or some other shape. The simple map data 100 is map data to which the information transmission determining information has been added. Each of the unit regions 101 is either an information transmission necessary region 101*a* or an information transmission unnecessary region 101*b*.

The information transmission necessary regions 101*a* represent areas that permit transmission of terminal position information by the portable terminal(s) 1 (indicated with a circle (○) in FIGS. 3 and 7 to 12) in that area. In other words, the information transmission necessary regions 101*a* are regions (e.g., an intersection) where the transmission of terminal position information from the portable terminal(s) 1 is permitted when the portable terminal(s) 1 exists therein. The information transmission unnecessary regions 101*b* represent areas that prohibit transmission of terminal position information by the portable terminal(s) 1 (indicated with an X in FIGS. 3 and 7 to 12) in that area. In other words, the information transmission unnecessary regions 101*b* are regions where the transmission of terminal position information from the portable terminal(s) 1 is prohibited when the portable terminal(s) 1 exists therein.

In the simple map data 100, any unit region 101 corresponding to an area that is densely populated with the portable terminals 1 or an area where the likelihood of the portable terminal(s) 1 existing is low is set as the information transmission unnecessary region 101*b*, and all other unit regions 101 are set as information transmission necessary regions 101*a*. In other words, in places where many portable terminals 1, i.e., many pedestrians, are highly likely to exist such as in front of train stations, in shopping areas, and in parks, the transmission of terminal position information from the portable terminals 1 to the information providing server 2 is prohibited such that information regarding each individual pedestrian is not reported to the driver of a host vehicle in which the onboard apparatus 3 is installed. Meanwhile, when the portable terminal(s) 1 is in a place where the likelihood of being involved in an accident with a vehicle is extremely small and it is not necessary to report pedestrian information to a driver of a vehicle such as in/on the ocean, in the mountains, or in/on a lake, the transmission of terminal position information from the portable terminal(s) 1 to the information providing server 2 is prohibited because pedestrian information will not provided to onboard apparatuses 3.

It is also acceptable to configure the information providing server 2 to employ a map creating section 14*c* to detect if each of the unit regions 101 is an area densely populated with the portable terminals 1 or an area where the likelihood of the portable terminal(s) 1 existing is low based on attribute information of areas contained in the detailed map data stored in the map storing section 13, and to set the unit regions 101 corresponding to either type of detected area as the information transmission unnecessary regions 101*b*. It is also acceptable to switch the setting of an area between the information transmission necessary region 101*a* and the information transmission unnecessary region 101*b* based on a time of day (e.g., day versus night) or to create new simple map data 100 automatically with the map creating section 14*c* whenever the detailed map data is changed.

The simple map data 100 is manufactured by the map creating section 14c, which is realized as operations executed by the control section 14. The map creating section 14c extracts a portion of the simple map data 100 that contains the unit region corresponding to terminal position information received by the communication section 11 and the communication section 11 transmits the extracted simple map data 100 to the portable terminal(s) 1. For example, as shown in FIG. 3, the map creating section 14c extracts a portion of simple map data 100 comprising a 9-by-9 cluster of the unit regions 101 centered on a terminal position region 101c (i.e., the unit region 101 containing terminal position information) and sets the extracted data as simple map data 102 that will be transmitted to the portable terminal(s) 1 of the terminal position region 101c all at once. The simple map data 102 prepared for transmission by the map creating section 14c is transmitted to the portable terminal(s) 1 through the wide area communication network N by the communication section 11, the communication section 11 being controlled by the communication control section 14a.

Figure 4:
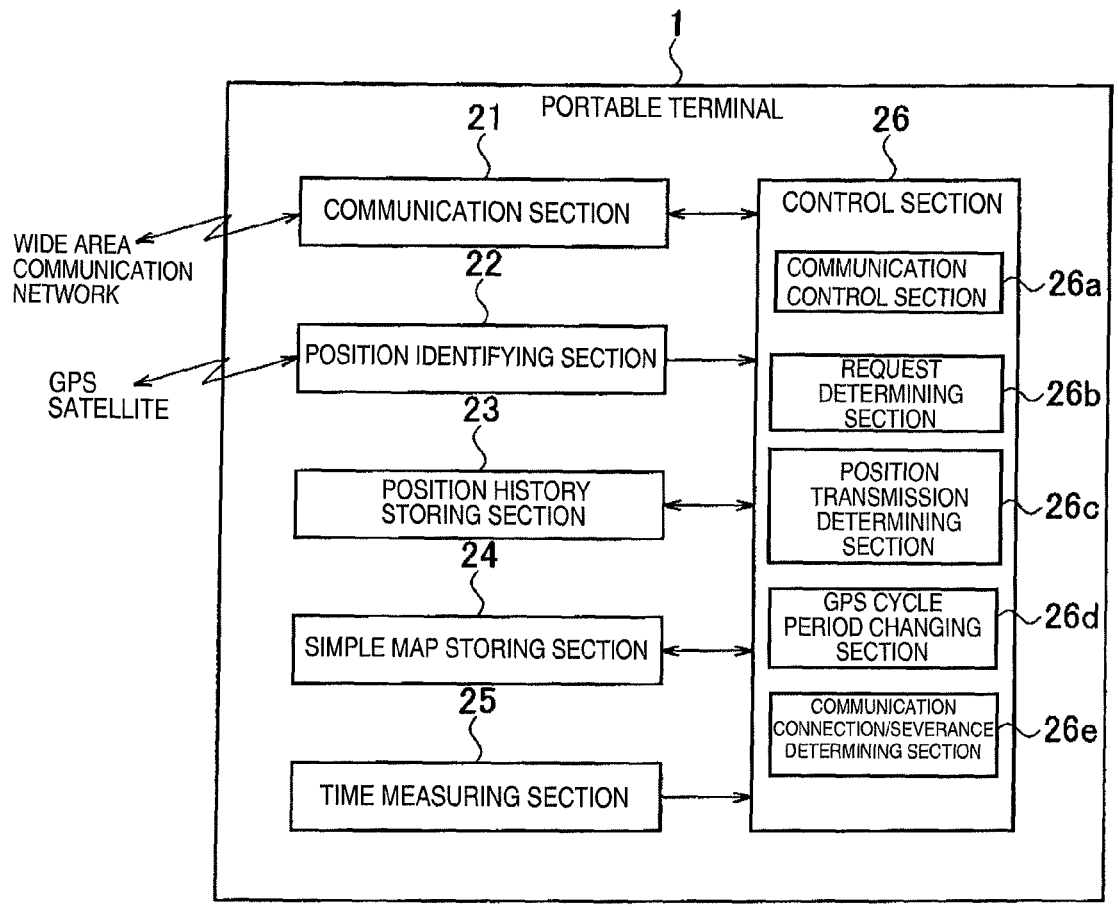
FIG. 4 is a block diagram showing basic components of a portable terminal of the information providing system (e.g., a moving body communication system) illustrated in FIG. 1.

As shown in FIG. 4, the portable terminal 1 includes a communication section 21, a position identifying section 22, a position history storing section 23, a simple map data storing section 24, a time measuring section 25 and a control section 26. The communication section 21 is configured to exchange information with the information providing server 2 through the wide area communication network N. The position identifying section 22 is configured to identify a position of the portable terminal 1 itself. The position history storing section 23 is configured to store history information regarding the position information of the portable terminal 1. The simple map data storing section 24 is configured to store simple map data 100 transmitted from the information providing server 2. The time measuring section 25 is configured to generate time information. The control section 26 is configured to control the overall operation of the portable terminal 1. The portable terminal 1 is a microcomputer that includes a central processing unit, an input interface circuit, an output interface circuit, and storage devices such as a ROM (Read Only Memory) device and a RAM (Random Access Memory) device. FIG. 4 is a block diagram illustrating the functions of the portable terminal as separate blocks or sections. These blocks or sections 21 to 26 are formed of conventional hardware and/or software.

The communication section 21 has an antenna circuit configured to send and receive wireless signals to and from the wide area communication network N, a transmission circuit configured to transmit wireless signals to the wide area communication network N, and a receiving circuit configured to process wireless signals received from the wide area communication network N. The communication section 21 serves to convert received wireless signals into digital information and supply the digital information to the control section 26. The communication section 21 also serves to generate a wireless signal when the communication section 21 receives digital information to be transmitted to the wide area communication network N from the control section 26.

More specifically, the communication section 21 sends terminal position information for the portable terminal 1 to the information providing server 2 through the wide area communication network N, and receives the simple map data 100 from the information providing server 2. The operation of the communication section 21 is controlled by the communication control section 26a of the control section 26. The communication control is accomplished by the communication control section 26a controlling the communication section 21 to establish and break a communication connection between the information providing server 2 and the portable terminal 1.

The position identifying section 22 receives a signal transmitted from a GPS satellite and generates position information identifying a position of the portable terminal 1. The terminal position information is supplied to the control section 26. The control section 26 feeds terminal position information acquired by the position identifying section 22 to the position history storing section 23 and the position history storing section 23 stores the terminal position information as history data.

More specifically, the position history storing section 23 combines the terminal position information acquired by the position identifying section 22 and delivered from the control section 26 with time information to obtain position history information that is accumulated in a time series fashion. The position history information is read by the control section 26 in order to calculate the movement direction and movement speed of a portable terminal 1.

The simple map storing section 24 stores simple map data 100 that is transmitted from the information providing server 2 and delivered thereto from the control section 26. The control section 26 refers to the simple map data 100 when the portable terminal 1 transmits terminal position information.

The time measuring section 25 generates time information used by the control section 26 for the execution of computer processing. The control section 26 reads in the time information.

The control section 26 is configured to execute a program stored in a memory (not shown) and, thereby, execute the functions of a request determining section 26b, a position transmission determining section 26c, a GPS cycle period changing section 26d, and a communication connection/severance determining section 26e.

The request determining section 26b determines if a request will be sent to the information providing server 3 that requests transmission of the simple map data 100 stored in the simple map storing section 24. More specifically, the request determining section 26b refers to the current terminal position information acquired by the position identifying section 22 and the position history information stored in the position history storing section 23 and determines if new simple map data 100 is required. If new simple map data 100 is required, then the communication control section 26a sends a map information transmission request to the information providing server 2 requesting a transmission of simple map data 100.

The position transmission determining section 26c compares the simple map data 100 stored in the simple map storing section 24 with terminal position information acquired by the position identifying section 22 and determines that the terminal position information should be transmitted if the portable terminal 1 exists in one of the information transmission necessary regions 101a. If position transmission determining section 26c determines that terminal position information should be transmitted, then the communication control section 26a transmits the terminal position information to the information providing server 2.

The GPS cycle period changing section 26d is configured to change a cycle period according to which the position identifying section 22 acquires terminal position information. More specifically, the GPS cycle period changing section 26d refers to the simple map data 100 stored in the simple map storing section 24, the current terminal position information acquired by the position identifying section 22 and the position history information stored in the position history storing section 23 for computing a cycle period for acquiring terminal position information. When the cycle period at which terminal position information is acquired will be changed, a command is issued to the position identifying section 22 and the operation of the position identifying section 22 is controlled accordingly.

The communication connection/severance determining section 26e determines when to establish and when to sever a communication connection between the communication section 21 and the information providing server 2 so that the communication connection state (session state) can be controlled. More specifically, the communication connection/severance determining section 26e refers to the simple map data 100 stored in the simple map storing section 24, the current terminal position information acquired by the position identifying section 22 and the position history information stored in the position history storing section 23 for issuing commands to the communication control section 26a to establish or sever a communication connection with the information providing server 2. The communication control section 26a then controls the communication connection state between the communication section 21 and the information providing server 2.

Figure 5:
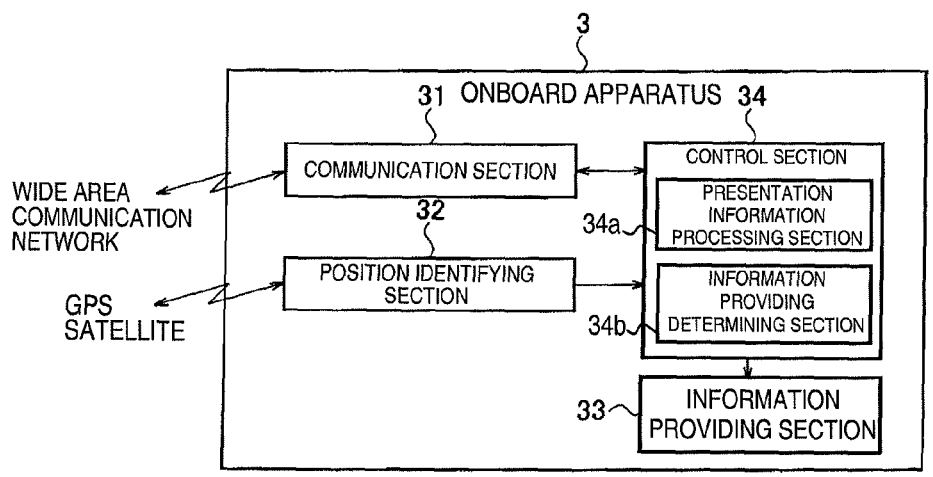
FIG. 5 is a block diagram showing basic components of an onboard apparatus of the information providing system (e.g., a moving body communication system) illustrated in FIG. 1.

As shown in FIG. 5, the onboard apparatus 3 includes a communication section 31, a position identifying section 32 an information providing section 33 and a control section 34. The communication section 31 is configured to exchange information with the information providing server 2 through the wide area communication network N. The position identifying section 32 is configured to identify a position of the onboard apparatus 3. The information providing section 33 is configured to provide various kinds of information. The control section 34 is configured to control operation of the onboard apparatus 3 as a whole. The onboard apparatus 3 a microcomputer that includes a central processing unit, an input interface circuit, an output interface circuit, and storage devices such as a ROM (Read Only Memory) device and a RAM (Random Access Memory) device. FIG. 5 is a block diagram illustrating the functions of the onboard apparatus 3 as separate blocks. These blocks or sections 31 to 34 are formed of conventional hardware and/or software.

The communication section 31 has an antenna circuit configured to send and receive wireless signals to and from the wide area communication network N, a transmission circuit configured to transmit wireless signals to the wide area communication network N, and a receiving circuit configured to process wireless signals received from the wide area communication network N. The communication section 31 serves to convert received wireless signals into digital information and supply the digital information to the control section 34. The communication section 31 also serves to generate a wireless signal when the communication section 31 receives digital information to be transmitted to the wide area communication network N from the control section 34.

More specifically, the communication section 31 is configured to send the host vehicle position information to the information providing server 2 through the wide area communication network N and to receive the presentation information from the information providing server 2. The operation of the communication section 31 is controlled by a presentation information processing section 34a of the control section 34. The communication control is accomplished by the control section 34 controlling the communication section 31 to establish and break a communication connection between the onboard apparatus 3 and the information providing server 2.

The position identifying section 32 receives a signal transmitted from a GPS satellite and generates the host vehicle position information specifying a position of the host vehicle in which the onboard apparatus 3 is installed. The host vehicle position information is supplied to the control section 34 and transmitted to the information providing server 2 through the communication section 31.

The control section 34 is configured to execute a program stored in a memory (not shown) and, thereby, execute the functions of the presentation information processing section 34a and an information providing determining section 34b.

The presentation information processing section 34a of the control section 34 serves to control the communication section 31 so as to transmit host vehicle position information acquired by the position identifying section 32 to the information providing server 2. The presentation information processing section 34a also serves to receive distribution data that comprises terminal position information distributed on map information and includes the transmitted host vehicle position. The distribution information covers, for example, approximately one square kilometer of map space centered generally on the host vehicle position.

The information providing section 33 comprises a display apparatus that a driver can view or a sound emitting apparatus configured to present sound to a driver. It is acceptable for the information providing section 33 to include an input section configured to detect an operation performed by a driver or other person.

When the control section 34 receives a command instructing it to display distribution data on the information providing section 33, the information providing determining section 34b displays the distribution data on a display section of the information providing section 33. It is also acceptable for the control section 34 to be configured to compare the host vehicle position information acquired by the position identifying section 32 with the terminal position information contained in the distribution data and determine that the information providing determining section 34b should display the distribution data if a distance from the host vehicle position to the terminal position is within a prescribed distance. It is also acceptable for the control section 34 to be configured to have the information providing determining section 34b issue a sound for notifying a driver that a pedestrian exists.

Thus, in this moving body communication system, the portable terminals 1 send terminal position information to the information providing server 2 and the information providing server 2 creates distribution data expressing a distribution of terminal position information. As a result, with this moving body communication system, when the onboard apparatus 3 sends host vehicle position information to the information providing server 2, the information providing server 2 can provide distribution data to the onboard apparatus 3 such that a position of a pedestrian possessing a portable terminal(s) 1 can be reported to a driver of the host vehicle in which the onboard apparatus 3 is installed.

Figure 6:
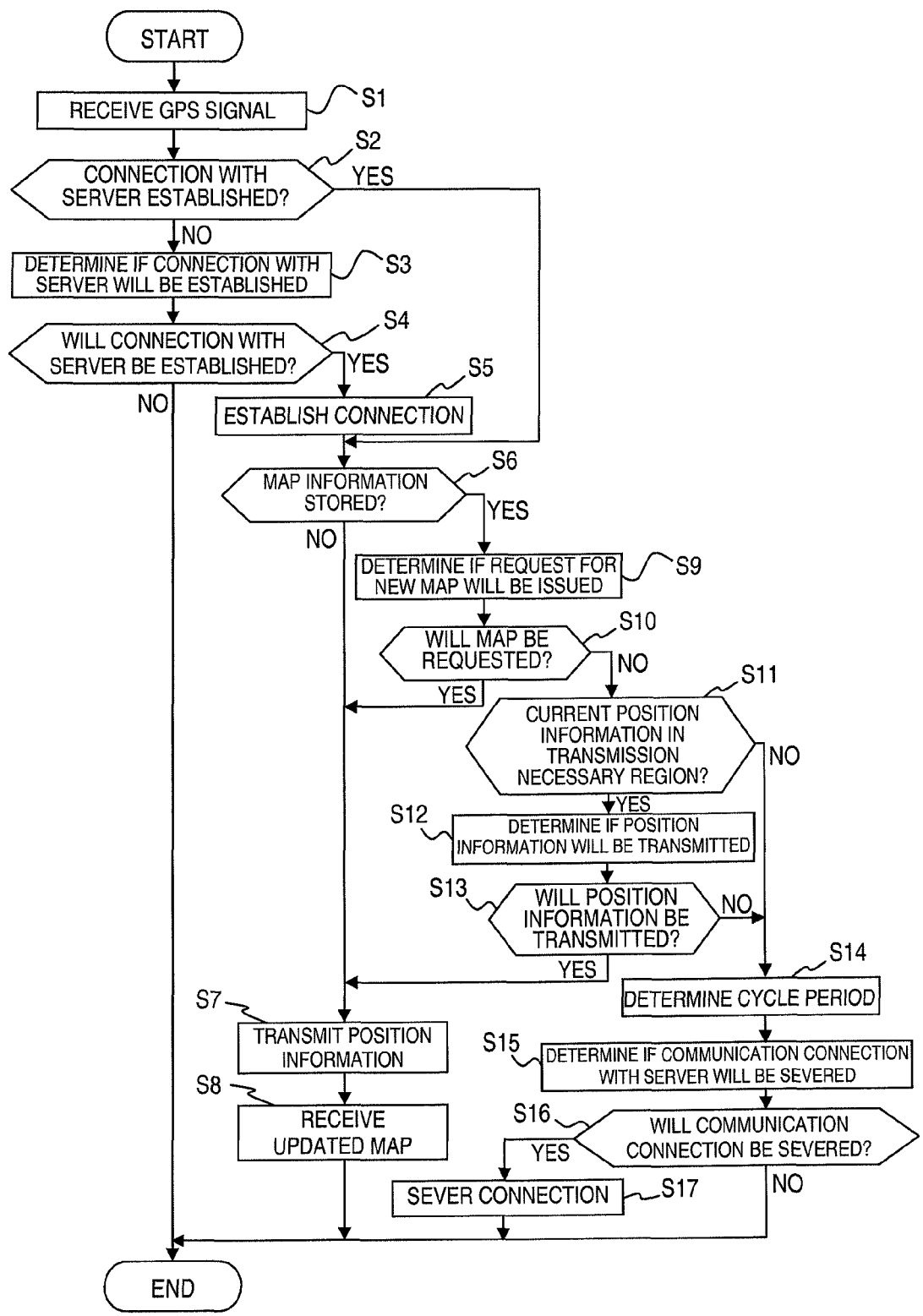
FIG. 6 is a flowchart showing the control processing steps executed in the information providing system (e.g., a moving body communication system) illustrated in FIG. 1 in order to reduce the electric power consumption of the moving body terminal (e.g., portable terminal)

The processing steps will now be explained with reference to FIG. 6 by which the moving body communication system, as described above, reduces the number of times the portable terminal 1 possessed by a pedestrian transmits terminal position information indicating a position of the pedestrian in order to reduce the electric power consumption of the portable terminal 1. The processing shown in FIG. 6 is executed once per prescribed processing cycle period.

In step S1, the position identifying section 22 of the portable terminal 1 receives a GPS signal and generates terminal position information comprising longitude and latitude information indicating the position of the portable terminal 1.

Also, the time measuring section 25 generates time information indicating the current time.

In step S2, the communication control section 26a of the portable terminal 1 determines if a communication connection is established with respect to the information providing server 2. If a communication connection currently exists with respect to the information providing server 2, then control proceeds to step S6. If a communication connection does not exist with respect to the information providing server 2, then control proceeds to step S3.

In step S3, the communication connection/severance determining section 26e of the portable terminal 1 executes processing to determine if a communication connection should be established with respect to the information providing server 2. More specifically, the communication connection/severance determining section 26e determines if a communication connection should be established between the portable terminal 1 and the information providing server 2 based on the current terminal position information and the information transmission necessary regions 101a and the information transmission unnecessary regions 101b in the simple map data 100 stored in the simple map storing section 24.

At a time other than when the power of the portable terminal 1 is turned on or when terminal position information is transmitted to the information providing server 2 and an application for presenting information to a driver of a vehicle is opened, a situation in which a communication connection is not established with respect to the information providing server 2 means a situation in which a communication connection with the information providing server 2 has been temporarily severed in order to reduce the electric power consumption of the portable terminal 1. Thus, in such a situation, the simple map data 102 used in step S3 is stored in the simple map storing section 24.

The processing for determining if a communication connection will be established with respect to the information providing server 2 amounts to proceeding automatically to step S5 when the power of the portable terminal 1 is turned on or when terminal position information is transmitted to the information providing server 2 and an application for presenting information to a driver of a vehicle is opened.

Figure 7:
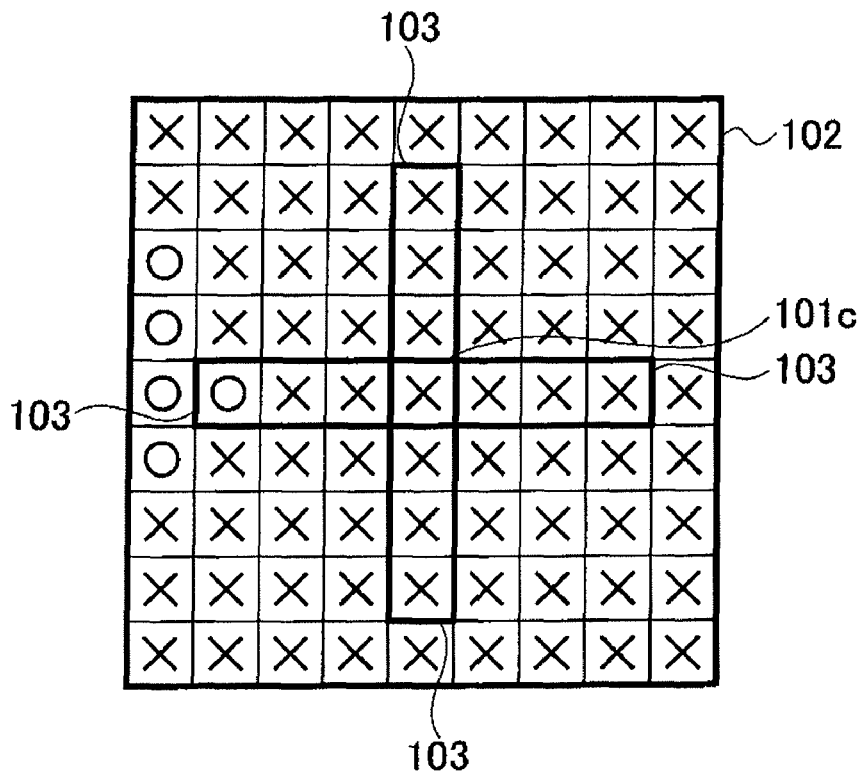
FIG. 7 is a diagram illustrating simple map data used in the information providing system (e.g., a moving body communication system) to determine if a communication connection will be established between the moving body terminal (e.g., portable terminal) and the information providing server without taking into account the movement direction of the moving body terminal (e.g., portable terminal)

For example, as shown in FIG. 7, the portable terminal 1 searches the simple map data 102 transmitted from the information providing server 2 for the information transmission necessary region 101a that is the closest to the terminal position region 101c where the portable terminal 1 exists. The maximum amount of time required for the portable terminal 1 to transmit a communication connection establishment request to the information providing server 2 and for a communication connection to actually be established is approximately 20 seconds, the walking speed of a pedestrian is approximately 4 km/hour, and the length of one side of a unit region 101 is assumed to be approximately 10 m. Therefore, the maximum number of unit regions 101 that a pedestrian can move through before a communication connection is established is two. Thus, as shown in FIG. 7, the communication connection/severance determining section 26e sets a search region 103 to encompass three unit regions 101 in each of the upward, downward, leftward, and rightward directions from the terminal position region 101c and determines if one of the information transmission necessary regions 101a exists within the search region 103.

In step S4, if the communication connection/severance determining section 26e determined that one of the information transmission necessary regions 101a exists in the search region 103, then it is determined that a communication connection will be established with the information providing server 2 and control proceeds to step S5. Meanwhile, if the closest information transmission necessary region 101a is located four or more unit regions 101 away from the terminal position region 101c, then it is determined that an information transmission necessary region 101a does not exist in the search region 103 and the control sequence is ended.

Figure 8:
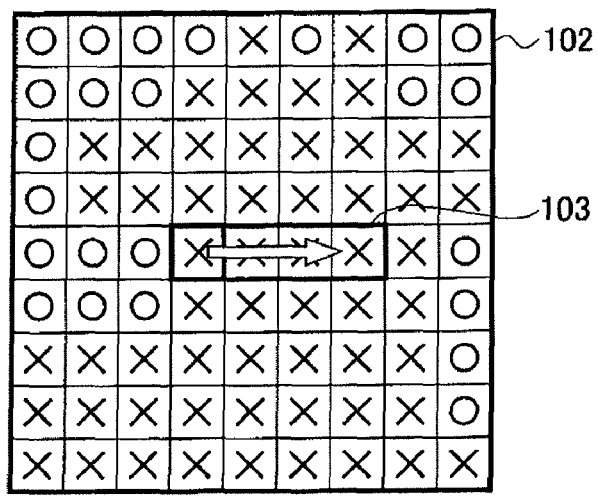
FIG. 8 is a diagram illustrating simple map data used in the information providing system (e.g., a moving body communication system) to determine if a communication connection will be established between the moving body terminal (e.g., portable terminal) and the information providing server while taking into account the movement direction of the moving body terminal (e.g., portable terminal.

It is also acceptable to configure the control such that in step S3, the communication connection/severance section 26e calculates the distance to the information transmission necessary region 101a that is closest to the terminal position region 101c based on a movement direction of the portable terminal 1 such as indicated with the arrow in FIG. 8. In such a case, the communication connection/severance section 26e determines the movement direction of the portable terminal 1 based on a change in the terminal position information stored in the position history storing section 23 and sets the search region 103 to encompass three unit regions 101 in the movement direction from the current terminal position region 101c. The communication connection/severance section 26e then determines the position of the closest information transmission necessary region 101a. If the communication connection/severance determining section 26e determines that one of the information transmission necessary regions 101a exists inside the search region 103, then control proceeds from step S4 to step S5. If one of the information transmission necessary regions 101a does not exist inside the search region 103, then the control sequence is ended.

The processing for determining the movement direction of the portable terminal 1 involves calculating a difference between past historical terminal position data. The movement direction can be calculated based solely on the latest terminal position information and terminal position information acquired immediately prior to the latest terminal position information, or based on terminal position information from a larger number of points in time. Since a movement direction calculated by the communication connection/severance determining section 26e could be different from the actual movement direction of the terminal position, it is also acceptable to set an angular movement range of approximately ±30 degrees centered on the movement direction calculated by the communication connection/severance determining section 26e. In such a case, it is determined that a communication connection will be established with the information providing server 2 if one of the information transmission necessary regions 101a is contained within the movement range.

In step S5, the communication control section 14a controls the communication section 11 so as to transmit a communication connection request containing ID information required for the portable terminal 1 to establish a communication connection with the information providing server 2. The communication control section 14a also executes authentication processing between the information providing server and the portable terminal 1 and establishes the communication connection.

In step S6, the control section 26 determines if the simple map data 102 that includes the current terminal position information is stored in the simple map storing section 24. More specifically, the control section 26 determines if the simple map data 102 is stored in the simple map storing section 24 and if terminal position information indicating a position of the portable terminal 1 is contained in the simple map data 102. If so, then control proceeds to step S9. If not, then control proceeds to step S7. Thus, when terminal position information indicating a position of the portable terminal 1 is contained in one of the unit regions 101 contained in the simple map data 102 transmitted from the information providing server 2, the portable terminal 1 uses the simple map data 102 to permit or prohibit a transmission of terminal position information and does not request new simple map data 102.

In step S7, the portable terminal 1 transmits the current terminal position information acquired by the position identifying section 22 and ends the control sequence. By transmitting terminal position information to the information providing server 2, in step S8 the portable terminal 1 can receive the simple map data 102 containing the transmitted terminal position information as a terminal position region 101c and store the simple map data 102 in the simple map storing section 24.

When the communication section 11 of the information providing server 2 receives the terminal position information, the map creating section 14c uses the simple map data 100 stored in the map storing section 13 to create an updated simple map data 102, as necessary, which contains the terminal position information as the terminal position region 101c. The information providing server 2 then transmits the created simple map data 102.

In step S9, the request determining section 26b of the control section 26 determines if a request for new simple map data 102 will be issued. More specifically, the request determining section 26b determines if the distance between the terminal position information identified by the position identifying section 22 and an edge portion of the simple map data 102 stored in the simple map storing section 24 is equal to or smaller than a prescribed distance N1, i.e., if the terminal position region 101c is near an edge portion of the simple map data 102. If so, then the request determining section 26b determines that a request for new simple map data 102 will be issued.

Figure 9:
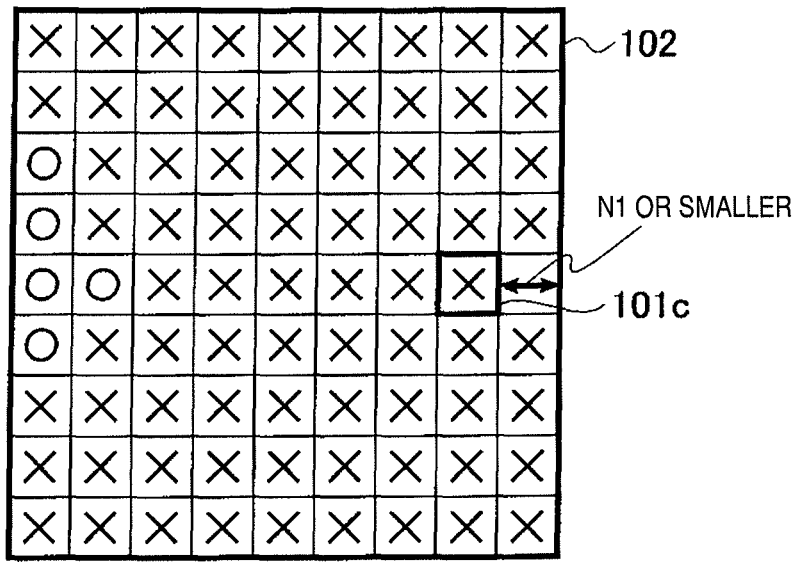
FIG. 9 is a diagram illustrating simple map data used in the information providing system (e.g., a moving body communication system) to explain processing executed to request new simple map data when the moving body terminal (e.g., portable terminal) is near an edge portion of the simple map data.
Figure 10:
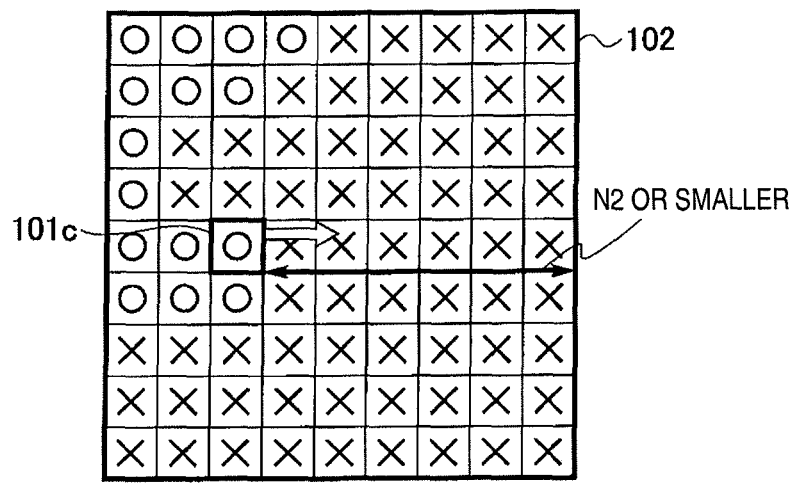
FIG. 10 is a diagram illustrating simple map data used in the information providing system (e.g., a moving body communication system) to explain processing executed when the moving body terminal position region is an information transmission necessary region but the moving body terminal (e.g., portable terminal) will not transmit terminal position information.

For example, as shown in FIG. 9, if the terminal position region 102c is located only one unit region 101 inward from an edge portion of the simple map data 102 and the prescribed distance N1 is set to two unit regions 101, then there is a possibility that the terminal position information will move outside the simple map data 102 such that it becomes impossible to determine if terminal position information should be transmitted or if the cycle period according to which terminal position information is computed (discussed later) should be changed. Therefore, before the terminal position information moves outside the simple map data 102, the portable terminal (s) 1 sends a transmission request to the information providing server 2 requesting a transmission of map information containing terminal position information of the portable terminal(s) 1, i.e., a transmission of new simple map data 102.

For example, if it is assumed that a pedestrian moves at approximately 4 km/hour and that the processing cycle period at which the portable terminal(s) 1 executes the flowchart of FIG. 6 (i.e., the cycle period at which the portable terminal(s) 1 determines if it will transmit terminal position information) is T seconds, then the distance (in meters) that a pedestrian could possibly move during one processing cycle period is given by 1.1×T. If the length of one side of the unit regions 101 is L, then the necessity of requesting new simple map data 102 can be determined with the inequality relationship (1.1× T)/L>N−1. If the number of the unit regions 101 from the edge portion of the simple map data 102 to the terminal position region 101c is equal to or smaller than N (the maximum number for which the preceding relationship is satisfied), then the portable terminal 1 requests new simple map data 102. Conversely, if the number of unit regions 101 from the edge portion of the simple map data 102 to the terminal position region 101c is larger than N, then the portable terminal 1 does not request new simple map data 102.

In step S10, it is determined if the request determining section 26b determined in step S9 that new simple map data 102 would be requested. If so, then control proceeds to step S7 and the portable terminal 1 transmits terminal position information before ending the control sequence. Meanwhile, if the request determining section 26b determined that new simple map data 102 would not be requested, then control proceeds to step S11.

In step S11, the position transmission determining section 26c compares the terminal position information acquired by the position identifying section 22 to the simple map data 102 stored in the simple map storing section 24 and checks the information transmission determining information in the terminal position information of the portable terminal 1 in order to determine if the current terminal position region 101c is one of the information transmission necessary regions 101a or in one of the information transmission unnecessary regions 101b. If the current terminal position region 101c is one of the information transmission necessary regions 101a, then control proceeds to step S12. If the current terminal position region 101c is one of the information transmission unnecessary regions 101b, then control proceeds to step S14.

In step S12, even though the terminal position region 101c in which the portable terminal 1 exists is one of the information transmission necessary regions 101a, the position transmission determining section 26c determines if the terminal position information of the portable terminal 1 should be transmitted to the information providing server 2. Although terminal position information is normally transmitted to the information providing server 2 when the portable terminal 1 exists in one of the information transmission necessary regions 101a, there are certain situations in which terminal position information is not transmitted. For example, if the terminal position information is changing in a direction like that shown in FIG. 10, then the position transmission determining section 26c calculates the distance in the movement direction from the portable terminal 1 to the closest one of the information transmission necessary regions 101a other than the terminal position region 101c. If the distance to the closest one of the information transmission necessary regions 101a is equal to or larger than a prescribed distance N2, then a transmission of the terminal position information is prohibited because the terminal position information will enter one of the information transmission unnecessary region 101b if it changes in the current movement direction. The computer processing used to calculate the movement direction of the terminal position information or to estimate a range of movement directions is the same as the processing described previously.

In step S13, the portable terminal 1 determines if, in step S12, the position transmission determining section 26c determined that terminal position information will be transmitted. If so, then control proceeds to step S7 and terminal position information is transmitted. If not, then control proceeds to step S14.

In step S14, the GPS cycle period changing section 26d determines if a cycle period at which the position history storing section 23 acquires terminal position information of the portable terminal 1 should be changed based on information transmission determining information of the unit regions 101 that make up the simple map data 102 stored in the simple map storing section 24.

Figure 11:
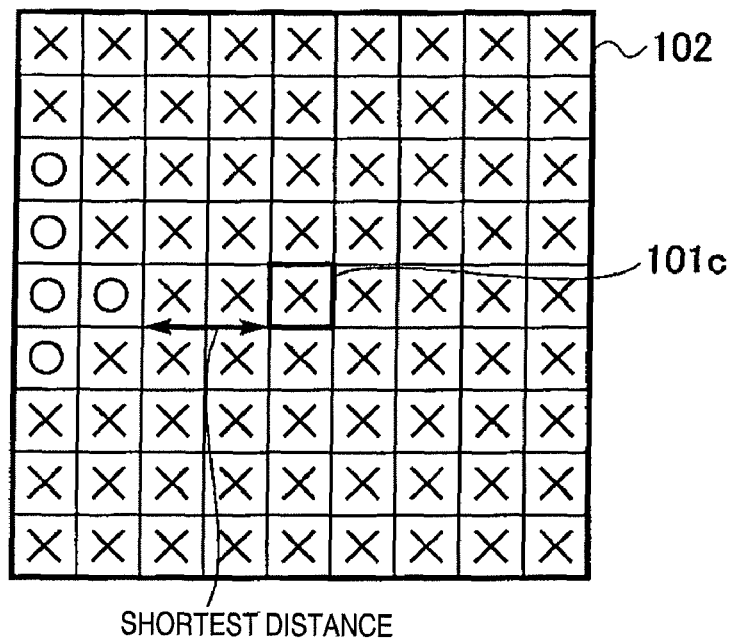
FIG. 11 is a diagram illustrating simple map data used in the information providing system (e.g., a moving body communication system) to explain processing executed in order to calculate a cycle period for computing terminal position information without taking into account the movement direction of the moving body terminal (e.g., portable terminal)
Figure 12:
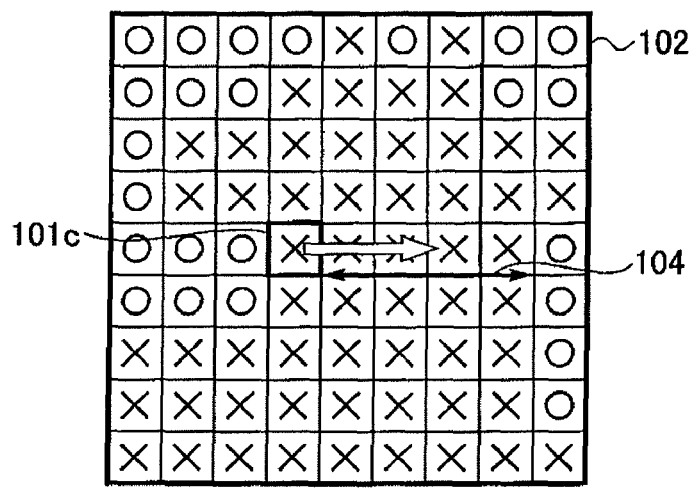
FIG. 12 is a diagram illustrating simple map data used in the information providing system (e.g., a moving body communication system) to explain processing executed in order to calculate a cycle period for computing terminal position information while taking into account the movement direction of the moving body terminal (e.g., portable terminal).

The GPS cycle period changing section 26d is configured such that when the terminal position information of the portable terminal 1 is in one of the information transmission unnecessary regions 101b, the GPS cycle period changing section 26d lengthens the cycle time at which the position identifying section 22 acquires terminal position information of the portable terminal 1 based on an amount of time to arrive at an information transmission necessary region 101a existing at a shortest distance from the current terminal position information of the portable terminal 1. For example, as shown in FIG. 11, the GPS cycle period changing section 26d finds the one of the information transmission necessary regions 101a that is closest to the terminal position region 101c in the simple map data 102 that contains the terminal position region 101c. Then, it determines the cycle period that must elapse before the next time terminal position information is acquired based on the distance from the terminal position region 101c to the one of the information transmission necessary regions 101a and the walking speed of a pedestrian. In the example shown in FIG. 11, the length of one side of a unit region 101 is 10 meters and the number of unit regions 101 to the closest information transmission necessary region 101a is five unit regions 101. Thus, the distance to the closest information transmission necessary region 101a is 50 meters. If the walking speed of a pedestrian is 4 km/hour, the amount of time for the pedestrian to reach the closest one of the information transmission necessary regions 101a is 45 seconds. Therefore, the GPS cycle period changing section 26d lengthens the cycle period until the next time terminal position information is computed to 45 seconds.

The GPS cycle period changing section 26d can also be configured such that when the terminal position information of the portable terminal 1 is in one of the information transmission unnecessary regions 101b, the GPS cycle period changing section 26d lengthens the cycle time at which the position identifying section 22 acquires terminal position information of the portable terminal 1 based on an amount of time to arrive at one of the information transmission necessary regions 101a existing at a shortest distance from the current terminal position information of the portable terminal 1 while taking into account the movement direction of the portable terminal 1. In such a case, the GPS cycle period changing section 26d uses the terminal position information stored in the position history storing section 23 to calculate a movement direction as shown, for example, in FIG. 12. The GPS cycle period changing section 26d then calculates a distance 104 to the closest one of the information transmission necessary regions 101a in the calculated movement direction. Then, the cycle period until the next time terminal position information is computed can be lengthened by calculating the time for the terminal position information to reach the closest one of the information transmission necessary regions 101a based on the distance 104 from the terminal position region 102c to the closest one of the information transmission necessary regions 101a, the walking speed of a pedestrian, and the length of one side of a unit region 101.

If, in step S13, the terminal position information is not transmitted even though the terminal position information of the portable terminal 1 is in one of the information transmission necessary regions 101a because information transmission unnecessary regions 101b exist in a continuous fashion to a movement destination along the current movement direction, then the GPS cycle period changing section 26d lengthens the cycle period at which terminal position information of the portable terminal 1 is computed by finding an amount of time the portable terminal 1 will move through the information transmission unnecessary regions 101b and setting the cycle period at which terminal position information is acquired accordingly.

In step S14, the cycle period for computing terminal position information is only changed if the information transmission unnecessary regions 101b are continuous. When there are many information transmission necessary regions 101a around the terminal position region 101c and the information transmission unnecessary regions 101b are distributed interstitially, it is usually necessary to transmit terminal position information. Therefore, in such a situation, it is preferable not to change the cycle period at which terminal position information is computed and, instead, to transmit terminal position information in accordance with the information transmission determining information added to the simple map data 102.

In step S15, the communication connection/severance determining section 26e determines if the communication connection between the information providing server 2 and the portable terminal 1 should be severed based on the terminal position information computing cycle period determined in step S14. More specifically, if the terminal position information of the portable terminal 1 is in one of the information transmission unnecessary regions 101b, then the communication connection/severance determining section 26e severs the communication for an amount of time required for the portable terminal 1 to move from the position indicated by the current terminal position information to the information transmission necessary region 101a that is closest thereto. Similarly, if the terminal position information of the portable terminal 1 is in one of the information transmission unnecessary regions 101b, then the communication connection/severance determining section 26e severs the communication for an amount of time required for the portable terminal 1 to move from the position indicated by the current terminal position information to the information transmission necessary region 101a that is closest thereto along the current movement direction of the portable terminal 1. Meanwhile, if the terminal position information of the portable terminal 1 is in an information transmission necessary region 101a and the information transmission unnecessary regions 101b exist in a continuous fashion to a movement destination along the current movement direction, then the communication connection/severance determining section 26e severs the communication connection for an amount of time required for the portable terminal 1 to move through the information transmission unnecessary regions 11b.

In step S16, the communication connection/severance determining section 26e determines to sever the communication connection for the amount of time determined in step S15 for severing the communication connection. In step S17, the communication control section 26a controls the communication section 11 so as to sever the communication connection between the portable terminal 1 and the information providing server 2.

When the communication connection between the portable terminal 1 and the information providing server 2 has been severed as just described, the result of step S2 in the next control cycle is negative and in step S3 the communication connection/severance determining section 26e determines if the terminal position information of the portable terminal 1 has drawn closer to an information transmission necessary region 101a. If so, then a communication connection is established with respect to the information providing server 2.

As described above in detail, with the moving body communication system in accordance of this embodiment, when the portable terminal 1 has sent terminal position information to the information providing server 2 and received the simple map data 102 sent from the information providing server 2, the portable terminal 1 compares unit regions 101 contained in the received simple map data 102 to the terminal position region 101c. The portable terminal 1 permits a transmission of current terminal position information if the terminal position region 101c is one of the information transmission necessary regions 101a and prohibits a transmission of current terminal position information if the terminal position region 101c is one of the information transmission unnecessary regions 101b. Consequently, it is not necessary for the portable terminal 1 to constantly transmit terminal position information in order for a driver of a vehicle to be made aware of pedestrians in a vicinity of the vehicle. Thus, with this moving body communication system, the frequency with which the portable terminal 1 transmits terminal position information can be reduced and the electric power consumption of the portable terminal 1 can be suppressed. Additionally, the amount of data communicated by the portable terminal(s) 1 can be reduced.

With this moving body communication system, since the amount of terminal position information transmitted from portable terminal(s) 1 to the information providing server 2 is reduced, the amount of data processing executed by the information providing server 2 in order to process terminal position information and manage the distribution of the portable terminal(s) 1 can be reduced.

Additionally, with this moving body communication system, it is not necessary to store map information in the portable terminal(s) 1 for distinguishing between the information transmission necessary regions 101a and the information transmission unnecessary regions 101b. Consequently, it is not necessary to provide large memories in the portable terminal(s) 1.

With this moving body communication system, if the simple map data 102 transmitted from the information providing server 2 to the portable terminal 1 contains terminal position information indicating a position of the same portable terminal 1, then the same simple map data 102 continues to be used and new simple map data 102 is not transmitted. As a result, the frequency with which the portable terminal 1 receives new simple map data 102 can be reduced, the amount of electric power consumed in order to receive simple map data 102 can be reduced, and the amount of data communicated by the portable terminal 1 can be suppressed.

With this moving body communication system, the portable terminal 1 sends a map information transmission request to the information providing server 2 when terminal position information of the portable terminal 1 is contained in a vicinity of an edge portion of simple map data 102 that was sent from the information providing apparatus 2. As a result, even if the terminal position information is outside the range of the simple map data 102, the portable terminal 1 can receive new simple map data 102 with which to determine if terminal position information should be transmitted and the overall electric power consumption of the portable terminal 1 can be reduced. Furthermore, the volume of data communication can be reduced.

In this moving body communication system, any unit region 101 corresponding to an area that is densely populated with portable terminals 1 or an area where the likelihood of a portable terminal 1 existing is low is set as one of the information transmission unnecessary regions 101b. As a result, the reporting of pedestrian information to drivers can be avoided in places highly likely to be densely populated with people (e.g., in front of train stations and in shopping areas) and the annoyance of frequent reporting of pedestrians can be alleviated. Additionally, the reliability of the system can be improved by stopping the presentation of pedestrian information from portable terminals 1 existing in places where the likelihood of being involved in an accident with a vehicle is extremely small and it is not necessary to present pedestrian information to a driver of a vehicle, such as in/on the ocean or in the mountains.

With this moving body communication system, attribute information contained in detailed map information and indicating if an area is, for example, a shopping area or in front of a train station can be used to detect places that are densely populated with portable terminals 1 and places where the likelihood of the portable terminal(s) 1 existing is extremely low and unit regions 101 corresponding to such places can be set as information transmission unnecessary regions 101b. As a result, the simple map data 102 can be managed entirely by the information providing server 2 and changes between information transmission necessary regions 101a and information transmission unnecessary regions 101b resulting from map information changes can be managed in one place.

In the moving body communication system, the cycle period according to which the portable terminal 1 acquires terminal position information can be changed based on whether the unit regions 101 in a vicinity of the terminal position region 101c are information transmission unnecessary regions 101b or information transmission necessary regions 101a. As a result, the electric power consumption of the portable terminal 1 can be reduced still further.

In this moving body communication system, when a terminal position region 101c is one of the information transmission unnecessary regions 101b, the cycle period at which the portable terminal 1 acquires terminal position information is lengthened based on an amount of time to reach an information transmission necessary region 101a existing at a shortest distance from the current terminal position information position of the portable terminal 1. As a result, the cycle period at which the position identifying section 22 receives a GPS signal and computes the terminal position information can be lengthened even further, the electric power consumption of the portable terminal 1 can be reduced, and the volume of data communication required for receiving GPS signals can be reduced. Additionally, with this moving body communication system, the electric power consumption of portable terminals 1 can be reduced even further because the communication connection between a portable terminal 1 and the information providing server 2 can be severed in addition to lengthening the cycle period at which terminal position information is computed.

In this moving body communication system, when a terminal position region 101c is an information transmission unnecessary region 101b, the cycle period at which the portable terminal 1 acquires terminal position information can be lengthened based on an amount of time to reach an information transmission necessary region 101a existing at a shortest distance from the terminal position region 101c in the current movement direction. As a result, the cycle period at which the position identifying section 22 receives a GPS signal and computes the terminal position information can be lengthened even further, the electric power consumption of the portable terminal 1 can be reduced, and the volume of data communication required for receiving GPS signals can be reduced. Additionally, with this moving body communication system, the electric power consumption of portable terminals 1 can be reduced even further because the communication connection between a portable terminal 1 and the information providing server 2 can be severed in addition to lengthening the cycle period at which terminal position information is computed.

In this moving body communication system, even when a terminal position region 101c is an information transmission necessary region 101a, if information transmission unnecessary regions 101b exist in a continuous fashion up to a movement destination along the current movement direction, then the cycle period at which the portable terminal 1 acquires terminal position information can be lengthened based on an amount of time to move through the information transmission unnecessary regions 101b. As a result, the cycle period at which the position identifying section 22 receives a GPS signal and computes the terminal position information can be lengthened even further, the electric power consumption of the portable terminal 1 can be reduced, and the volume of data communication required for receiving GPS signals can be reduced. Additionally, with this moving body communication system, the electric power consumption of portable terminals 1 can be reduced even further because the communication connection between a portable terminal 1 and the information providing server 2 can be severed in addition to lengthening the cycle period at which terminal position information is computed.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A moving body communication system comprising:
    a moving body terminal; and
    an information providing apparatus including
        a wireless communication section configured to send and receive information to and from the moving body terminal;
        a map information storing section configured to store map information that is map information being divided into a plurality of unit regions, with each of the unit regions being designated as either an information transmission necessary region in which a position of the moving body terminal is required, or an information transmission unnecessary region in which the position of the moving body terminal is not required, and
        a transmission control section configured to extract map information containing the unit region corresponding to the position information of the moving body terminal received with the communication section and containing designations for each of the plurality of unit regions as being one of the information transmission necessary region and the information transmission unnecessary region, and to wirelessly transmit the map information that was extracted to the moving body terminal using the communication section,
    the information providing apparatus being further configured to designate as the information transmission unncessary regions, the unit regions of the map information stored in the map information storing section of the information providing apparatus which correspond to a densely populated area with a plurality of the moving body terminals over a prescribed threshold, or which correspond to an area where the likelihood of the moving body terminal existing is low,
    the moving body terminal including
        a position information acquiring section configured to acquire the position information indicating a current position of the moving body terminal,
        a wireless communication section configured to wirelessly transmit the position information acquired with the position information acquiring section to the information providing apparatus, and to wirelessly receive the map information transmitted from the information providing apparatus, and
        a control section configured to determine if the position information acquired with the position information acquiring section should be sent to the information providing apparatus,
    the control section of the moving body terminal being further configured such that the control section compares the unit regions contained in the map information that was received from the information providing apparatus to the position information that was acquired with the position information acquiring section such that subsequent transmission of the position information is permitted when the unit region corresponding to the current position of the moving body terminal is designated as the information transmission necessary region, and such that subsequent transmission of the position information is prevented when the unit region corresponding to the current position of the moving body terminal is designated as the information transmission unnecessary region.

2. The moving body communication system recited in claim 1, wherein
    the information providing apparatus further comprises a map creating section configured to detect a densely populated area with a plurality of the moving body terminals over a prescribed threshold, or an area where the likelihood of the moving body terminal existing is low based on area attribute information contained in the map information stored in the map information storing section, and designate as the information transmission unnecessary regions, the unit regions of the map information stored in the map information storing section of the information providing apparatus corresponding to the area that was detected.

3. The moving body communication system recited in claim 1, wherein
the moving body terminal is configured to change a cycle period at which the position information acquiring section acquires position information indicating the current position of the moving body terminal based on a designation of the unit regions in a vicinity of the unit region corresponding to the current position of the moving body terminal as being as either one of the information transmission necessary regions or one of the information transmission unnecessary regions.

4. The moving body communication system recited in claim 3, wherein
the moving body terminal is configured to lengthen the cycle period at which the information acquiring section acquires the position information indicating the current position of the moving body terminal based on an amount of time to arrive at one of the information transmission necessary regions existing at a shortest distance from the current position of the moving body terminal, when the current position of the moving body terminal is in one of the information transmission unnecessary regions.

5. The moving body communication system recited in claim 3, wherein
the moving body terminal is configured to lengthen the cycle period at which the information acquiring section acquires the position information indicating the current position of the moving body terminal based on an amount of time to arrive at one of the information transmission necessary regions existing at a shortest distance from the current position of the moving body terminal in a current movement direction of the moving body terminal, when the current position of the moving body terminal is in one of the information transmission unnecessary regions.

6. The moving body communication system recited in claim 3, wherein
the moving body terminal is configured to lengthen the cycle period at which the information acquiring section acquires the position information indicating the current position of the moving body terminal based on an amount of time for the moving body terminal to move through a plurality of the information transmission unnecessary regions that exists in a continuous fashion along a current movement direction of the moving body terminal, when the current position of the moving body terminal is in one of the information transmission necessary regions and the plurality of the information transmission unnecessary regions continuously exists from the current position of the moving body terminal to a movement destination along the current movement direction of the moving body terminal.

7. The moving body communication system recited in claim 1, wherein
the moving body terminal is configured to sever a communication connection existing between the moving body terminal and the information providing apparatus based on an amount of time to arrive at one of the information transmission necessary regions existing at a shortest distance from the current position of the moving body terminal when the current position of the moving body terminal is in one of the information transmission unnecessary regions, and to establish a communication connection with the information providing apparatus when the current position of the moving body terminal has drawn close to one of the information transmission necessary regions.

8. The moving body communication system recited in claim 1, wherein
the moving body terminal is configured to sever a communication connection existing between the moving body terminal and the information providing apparatus based on an amount of time to arrive at one of the information transmission necessary regions existing at a shortest distance from the current position of the moving body terminal in a current movement direction when the current position of the moving body terminal is in one of the information transmission unnecessary regions, and to establish a communication connection with the information providing apparatus when the current position of the moving body terminal has drawn close to one of the information transmission necessary regions.

9. The moving body communication system recited in claim 1, wherein
the moving body terminal is configured to sever a communication connection existing between the moving body terminal and the information providing apparatus based on an amount of time the moving body terminal will move through a plurality of the information transmission unnecessary regions when the current position of the moving body terminal is in one of the information transmission necessary regions and the plurality of the information transmission unnecessary regions that exists in a continuous fashion to a movement destination along a current movement direction of the moving body terminal, and to establish a communication connection with the information providing apparatus when the current position of the moving body terminal has drawn close to one of the information transmission necessary regions.

10. A moving body communication system comprising:
a moving body terminal; and
an information providing apparatus including
a communication section configured to send and receive information to and from the moving body terminal;
a map information storing section configured to store map information that is map information being divided into a plurality of unit regions, with each of the unit regions being designated as either an information transmission necessary region in which a position of the moving body terminal is required, or an information transmission unnecessary region in which the position of the moving body terminal is not required, and
a transmission control section configured to extract map information containing the unit region corresponding to the position information of the moving body terminal received with the communication section and transmit the map information that was extracted to the moving body terminal using the communication section,
the information providing apparatus being further configured to designate as the information transmission unncessary regions, the unit regions of the map information stored in the map information storing section of the information providing apparatus which correspond to a densely populated area with a plurality of the moving body terminals over a prescribed threshold, or which correspond to an area where the likelihood of the moving body terminal existing is low, the moving body terminal including
- a position information acquiring section configured to acquire the position information indicating a current position of the moving body terminal,
- a communication section configured to transmit the position information acquired with the position information acquiring section to the information providing apparatus, and to receive the map information transmitted from the information providing apparatus, and the communication section being further configured to send a transmission request to the information providing apparatus requesting a transmission of updated map information based on the position information of the moving body terminal that was acquired with the position information acquiring section, when the position information indicating the position of the moving body terminal is contained in a vicinity of an edge portion of the map information that was sent from the information providing apparatus prior to transmission of the updated map information, the edge portion including an end of the map information that was previously received where there is no information in the map information past the end of the map information, and
- a control section configured to determine if the position information acquired with the position information acquiring section should be sent to the information providing apparatus, the control section of the moving body terminal being further configured such that the control section compares the unit regions contained in the map information that was received from the information providing apparatus to the position information that was acquired with the position information acquiring section such that subsequent transmission of the position information is permitted when the unit region corresponding to the current position of the moving body terminal is designated as the information transmission necessary region, and such that subsequent transmission of the position information is prevented when the unit region corresponding to the current position of the moving body terminal is designated as the information transmission unnecessary region.

11. A moving body terminal comprising:

a position information acquiring section configured to acquire position information indicating a current position of the moving body terminal;

a wireless communication section configured to wirelessly transmit the position information acquired with the position information acquiring section to an information providing apparatus and to wirelessly receive map information transmitted from the information providing apparatus in which the map information is divided into a plurality of unit regions, with each of the unit regions being designated as either an information transmission necessary region in which a position of the moving body terminal is required, or an information transmission unnecessary region in which the position of the moving body terminal is not required; and a control section configured to determine if position information acquired with the position information acquiring section should be sent to the information providing apparatus, the control section being further configured such that, upon receiving the map information sent from the information providing apparatus that was based on the position information acquired with the position information acquiring section being sent to the information providing apparatus, the control section compares the unit regions contained in the map information that was received from the information providing apparatus to the position information that was acquired with the position information acquiring section and such that subsequent transmission of the position information acquired with the position information acquiring section is permitted when the unit region corresponding to the current position of the moving body terminal is designated as the information transmission necessary region, and such that subsequent transmission of the position information is prevented when the unit region corresponding to the current position of the moving body terminal is designated as the information transmission unnecessary region, the information transmission unnecessary regions bring designate as the unit regions of the map information which correspond to a densely populated area with a plurality of the moving body terminals over a prescribed threshold, or which correspond to an area where the likelihood of the moving body terminal existing is low.

12. A moving body communication system comprising:

a moving body terminal; and an information providing apparatus including
- a wireless communication section configured to send and receive information to and from the moving body terminal;
- a map information storing section configured to store map information that is map information being divided into a plurality of unit regions, with each of the unit regions being designated as either an information transmission necessary region in which a position of the moving body terminal is required, or an information transmission unnecessary region in which the position of the moving body terminal is not required,
- a map creating section configured to detect a densely populated area with a plurality of the moving body terminals over a prescribed threshold, or an area where the likelihood of the moving body terminal existing is low based on area attribute information contained in the map information stored in the map information storing section, and designate as the information transmission unnecessary regions, the unit regions of the map information stored in the map information storing section of the information providing apparatus corresponding to the area that was detected, and
- a transmission control section configured to extract map information containing the unit region corresponding to the position information of the moving body terminal received with the communication section and containing designations for each of the plurality of unit regions as being one of the information transmission necessary region and the information transmission unnecessary region, and to wirelessly transmit the map information that was extracted to the moving body terminal using the communication section, the moving body terminal including
- a position information acquiring section configured to acquire the position information indicating a current position of the moving body terminal,
- a wireless communication section configured to wirelessly transmit the position information acquired with the position information acquiring section to the information providing apparatus, and to wirelessly receive the map information transmitted from the information providing apparatus, and a control section configured to determine if the position information acquired with the position information acquiring section should be sent to the information providing apparatus, the control section of the moving body terminal being further configured such that the control section compares the unit regions contained in the map information that was received from the information providing apparatus to the position information that was acquired with the position information acquiring section such that subsequent transmission of the position information is permitted when the unit region corresponding to the current position of the moving body terminal is designated as the information transmission necessary region, and such that subsequent transmission of the position information is prevented when the unit region corresponding to the current position of the moving body terminal is designated as the information transmission unnecessary region.

13. A moving body communication system comprising:

a moving body terminal; and an information providing apparatus including a wireless communication section configured to send and receive information to and from the moving body terminal;

a map information storing section configured to store map information that is map information being divided into a plurality of unit regions, with each of the unit regions being designated as either an information transmission necessary region in which a position of the moving body terminal is required, or an information transmission unnecessary region in which the position of the moving body terminal is not required, and a transmission control section configured to extract map information containing the unit region corresponding to the position information of the moving body terminal received with the communication section and containing designations for each of the plurality of unit regions as being one of the information transmission necessary region and the information transmission unnecessary region, and to wirelessly transmit the map information that was extracted to the moving body terminal using the communication section, the moving body terminal including a position information acquiring section configured to acquire the position information indicating a current position of the moving body terminal, a wireless communication section configured to wirelessly transmit the position information acquired with the position information acquiring section to the information providing apparatus, and to wirelessly receive the map information transmitted from the information providing apparatus, and a control section configured to determine if the position information acquired with the position information acquiring section should be sent to the information providing apparatus, the control section of the moving body terminal being further configured such that the control section compares the unit regions contained in the map information that was received from the information providing apparatus to the position information that was acquired with the position information acquiring section such that subsequent transmission of the position information is permitted when the unit region corresponding to the current position of the moving body terminal is designated as the information transmission necessary region, and such that subsequent transmission of the position information is prevented when the unit region corresponding to the current position of the moving body terminal is designated as the information transmission unnecessary region, the control section of the moving body terminal being further configured to change a cycle period at which the position information acquiring section acquires position information indicating the current position of the moving body terminal based on a designation of the unit regions in a vicinity of the unit region corresponding to the current position of the moving body terminal as being as either one of the information transmission necessary regions or one of the information transmission unnecessary regions.

14. A moving body communication system comprising:

a moving body terminal; and an information providing apparatus including a communication section configured to send and receive information to and from the moving body terminal;

a map information storing section configured to store map information that is map information being divided into a plurality of unit regions, with each of the unit regions being designated as either an information transmission necessary region in which a position of the moving body terminal is required, or an information transmission unnecessary region in which the position of the moving body terminal is not required, a map creating section configured to detect a densely populated area with a plurality of the moving body terminals over a prescribed threshold, or an area where the likelihood of the moving body terminal existing is low based on area attribute information contained in the map information stored in the map information storing section, and designate as the information transmission unnecessary regions, the unit regions of the map information stored in the map information storing section of the information providing apparatus corresponding to the area that was detected, and a transmission control section configured to extract map information containing the unit region corresponding to the position information of the moving body terminal received with the communication section and transmit the map information that was extracted to the moving body terminal using the communication section, the moving body terminal including a position information acquiring section configured to acquire the position information indicating a current position of the moving body terminal, a communication section configured to transmit the position information acquired with the position information acquiring section to the information providing apparatus, to receive the map information transmitted from the information providing apparatus, and to send a transmission request to the information providing apparatus requesting a transmission of updated map information based on the position information of the moving body terminal that was acquired with the position information acquiring section, when the position information indicating the position of the moving body terminal is contained in a vicinity of an edge portion of the map information that was sent from the information providing apparatus prior to transmission of the updated map information, the edge portion including an end of the map information that was previously received where there is no information in the map information past the end of the map information, and a control section configured to determine if the position information acquired with the position information acquiring section should be sent to the information providing apparatus, the control section of the moving body terminal being further configured such that the control section compares the unit regions contained in the map information that was received from the information providing apparatus to the position information that was acquired with the position information acquiring section such that subsequent transmission of the position information is permitted when the unit region corresponding to the current position of the moving body terminal is designated as the information transmission necessary region, and such that subsequent transmission of the position information is prevented when the unit region corresponding to the current position of the moving body terminal is designated as the information transmission unnecessary region.

15. A moving body communication system comprising:
a moving body terminal; and
an information providing apparatus including a communication section configured to send and receive information to and from the moving body terminal;

a map information storing section configured to store map information that is map information being divided into a plurality of unit regions, with each of the unit regions being designated as either an information transmission necessary region in which a position of the moving body terminal is required, or an information transmission unnecessary region in which the position of the moving body terminal is not required, and a transmission control section configured to extract map information containing the unit region corresponding to the position information of the moving body terminal received with the communication section and transmit the map information that was extracted to the moving body terminal using the communication section, the moving body terminal including a position information acquiring section configured to acquire the position information indicating a current position of the moving body terminal, a communication section configured to transmit the position information acquired with the position information acquiring section to the information providing apparatus, to receive the map information transmitted from the information providing apparatus, and to send a transmission request to the information providing apparatus requesting a transmission of updated map information based on the position information of the moving body terminal that was acquired with the position information acquiring section, when the position information indicating the position of the moving body terminal is contained in a vicinity of an edge portion of the map information that was sent from the information providing apparatus prior to transmission of the updated map information, the edge portion including an end of the map information that was previously received where there is no information in the map information past the end of the map information, and a control section configured to determine if the position information acquired with the position information acquiring section should be sent to the information providing apparatus, the control section of the moving body terminal being further configured such that the control section compares the unit regions contained in the map information that was received from the information providing apparatus to the position information that was acquired with the position information acquiring section such that subsequent transmission of the position information is permitted when the unit region corresponding to the current position of the moving body terminal is designated as the information transmission necessary region, and such that subsequent transmission of the position information is prevented when the unit region corresponding to the current position of the moving body terminal is designated as the information transmission unnecessary region, the control section of the moving body terminal being further configured to change a cycle period at which the position information acquiring section acquires position information indicating the current position of the moving body terminal based on a designation of the unit regions in a vicinity of the unit region corresponding to the current position of the moving body terminal as being as either one of the information transmission necessary regions or one of the information transmission unnecessary regions.

16. A moving body terminal comprising:
a position information acquiring section configured to acquire position information indicating a current position of the moving body terminal;

a wireless communication section configured to wirelessly transmit the position information acquired with the position information acquiring section to an information providing apparatus and to wirelessly receive map information transmitted from the information providing apparatus in which the map information is divided into a plurality of unit regions, with each of the unit regions being designated as either an information transmission necessary region in which a position of the moving body terminal is required, or an information transmission unnecessary region in which the position of the moving body terminal is not required; and a control section configured to determine if position information acquired with the position information acquiring section should be sent to the information providing apparatus, the control section being further configured such that, upon receiving the map information sent from the information providing apparatus that was based on the position information acquired with the position information acquiring section being sent to the information providing apparatus, the control section compares the unit regions contained in the map information that was received from the information providing apparatus to the position information that was acquired with the position information acquiring section and such that subsequent transmission of the position information acquired with the position information acquiring section is permitted when the unit region corresponding to the current position of the moving body terminal is designated as the information transmission necessary region, and such that subsequent transmission of the position information is prevented when the unit region corresponding to the current position of the moving body terminal is designated as the information transmission unnecessary region, the control section being further configured to change a cycle period at which the position information acquiring section acquires position information indicating the current position of the moving body terminal based on a designation of the unit regions in a vicinity of the unit region corresponding to the current position of the moving body terminal as being as either one of the information transmission necessary regions or one of the information transmission unnecessary regions.

17. The moving body terminal recited in claim 16, wherein the moving body terminal is configured to lengthen the cycle period at which the information acquiring section acquires the position information indicating the current position of the moving body terminal based on an amount of time to arrive at one of the information transmission necessary regions existing at a shortest distance from the current position of the moving body terminal, when the current position of the moving body terminal is in one of the information transmission unnecessary regions.

18. The moving body terminal recited in claim 16, wherein the moving body terminal is configured to lengthen the cycle period at which the information acquiring section acquires the position information indicating the current position of the moving body terminal based on an amount of time to arrive at one of the information transmission necessary regions existing at a shortest distance from the current position of the moving body terminal in a current movement direction of the moving body terminal, when the current position of the moving body terminal is in one of the information transmission unnecessary regions.

19. The moving body terminal recited in claim 16, wherein the moving body terminal is configured to lengthen the cycle period at which the information acquiring section acquires the position information indicating the current position of the moving body terminal based on an amount of time for the moving body terminal to move through a plurality of the information transmission unnecessary regions that exists in a continuous fashion along a current movement direction of the moving body terminal, when the current position of the moving body terminal is in one of the information transmission necessary regions and the plurality of the information transmission unnecessary regions continuously exists from the current position of the moving body terminal to a movement destination along the current movement direction of the moving body terminal.

20. The moving body terminal recited in claim 16, wherein the moving body terminal is configured to sever a communication connection existing between the moving body terminal and the information providing apparatus based on an amount of time to arrive at one of the information transmission necessary regions existing at a shortest distance from the current position of the moving body terminal when the current position of the moving body terminal is in one of the information transmission unnecessary regions, and to establish a communication connection with the information providing apparatus when the current position of the moving body terminal has drawn close to one of the information transmission necessary regions.

21. The moving body terminal recited in claim 16, wherein the moving body terminal is configured to sever a communication connection existing between the moving body terminal and the information providing apparatus based on an amount of time to arrive at one of the information transmission necessary regions existing at a shortest distance from the current position of the moving body terminal in a current movement direction when the current position of the moving body terminal is in one of the information transmission unnecessary regions, and to establish a communication connection with the information providing apparatus when the current position of the moving body terminal has drawn close to one of the information transmission necessary regions.

22. The moving body terminal recited in claim 16, wherein the moving body terminal is configured to sever a communication connection existing between the moving body terminal and the information providing apparatus based on an amount of time the moving body terminal will move through a plurality of the information transmission unnecessary regions when the current position of the moving body terminal is in one of the information transmission necessary regions and the plurality of the information transmission unnecessary regions that exists in a continuous fashion to a movement destination along a current movement direction of the moving body terminal, and to establish a communication connection with the information providing apparatus when the current position of the moving body terminal has drawn close to one of the information transmission necessary regions.

* * * * *